Oct. 9, 1962 W. R. BUTLER ET AL 3,057,271
CAST STRUCTURAL GRATINGS
Filed Dec. 13, 1957 2 Sheets-Sheet 1
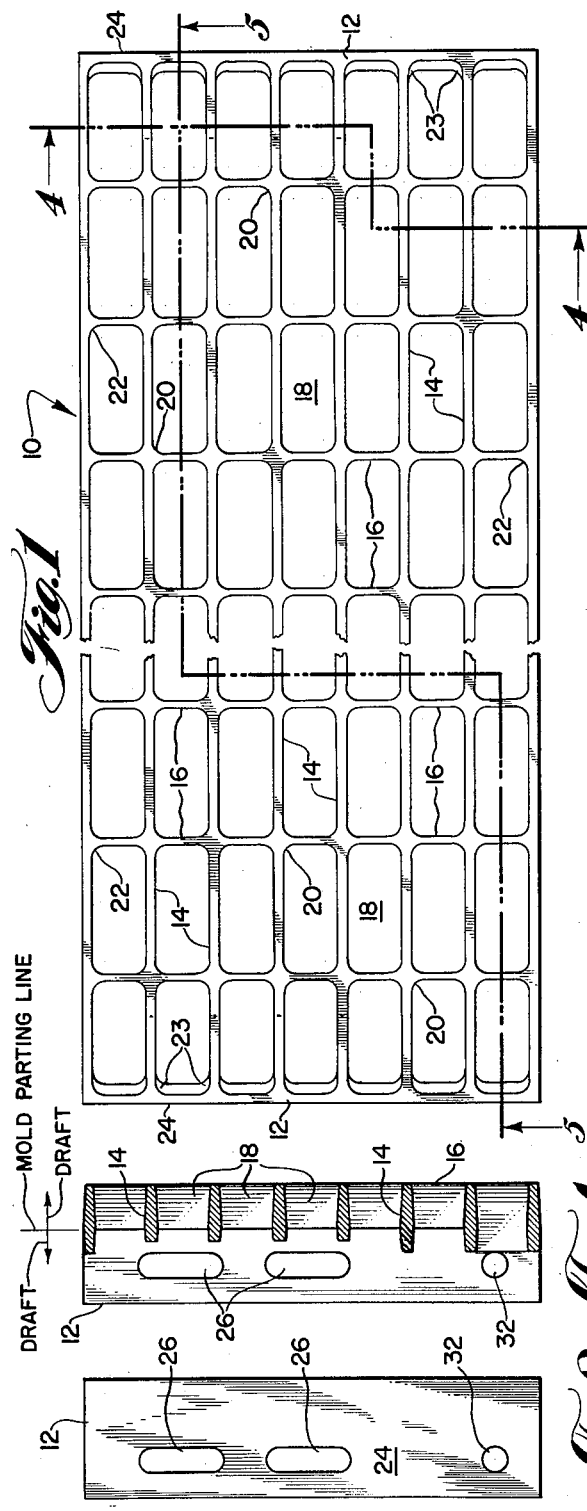
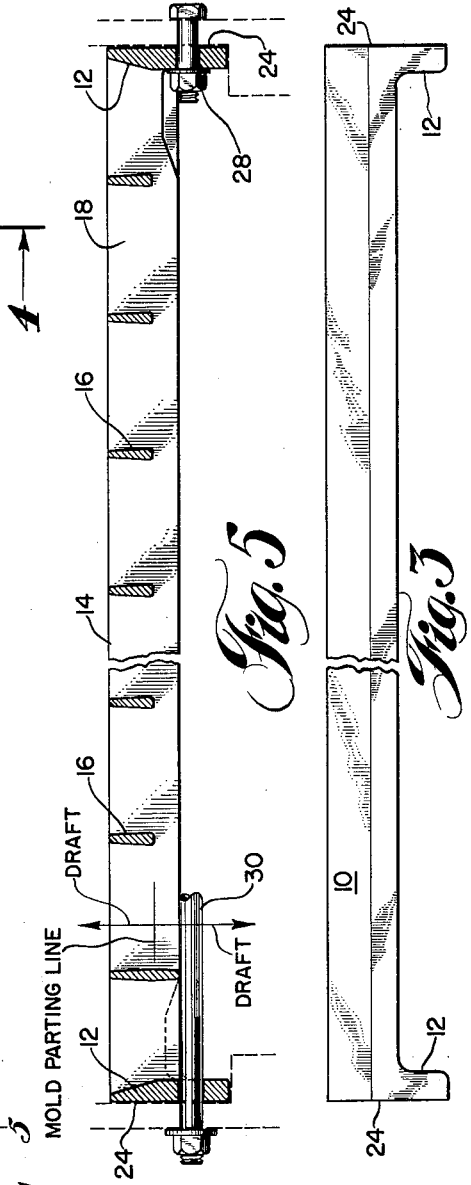
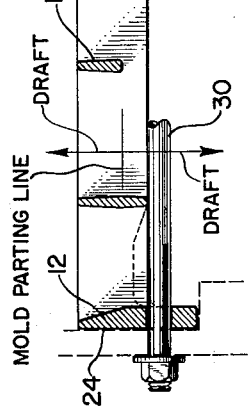
INVENTORS
WILLIAM R. BUTLER
GEORGE L. MOORE
WAYNE C. KEITH
FREDERICK D. SANBORN
BY S. Ernest Low.
ATTORNEY

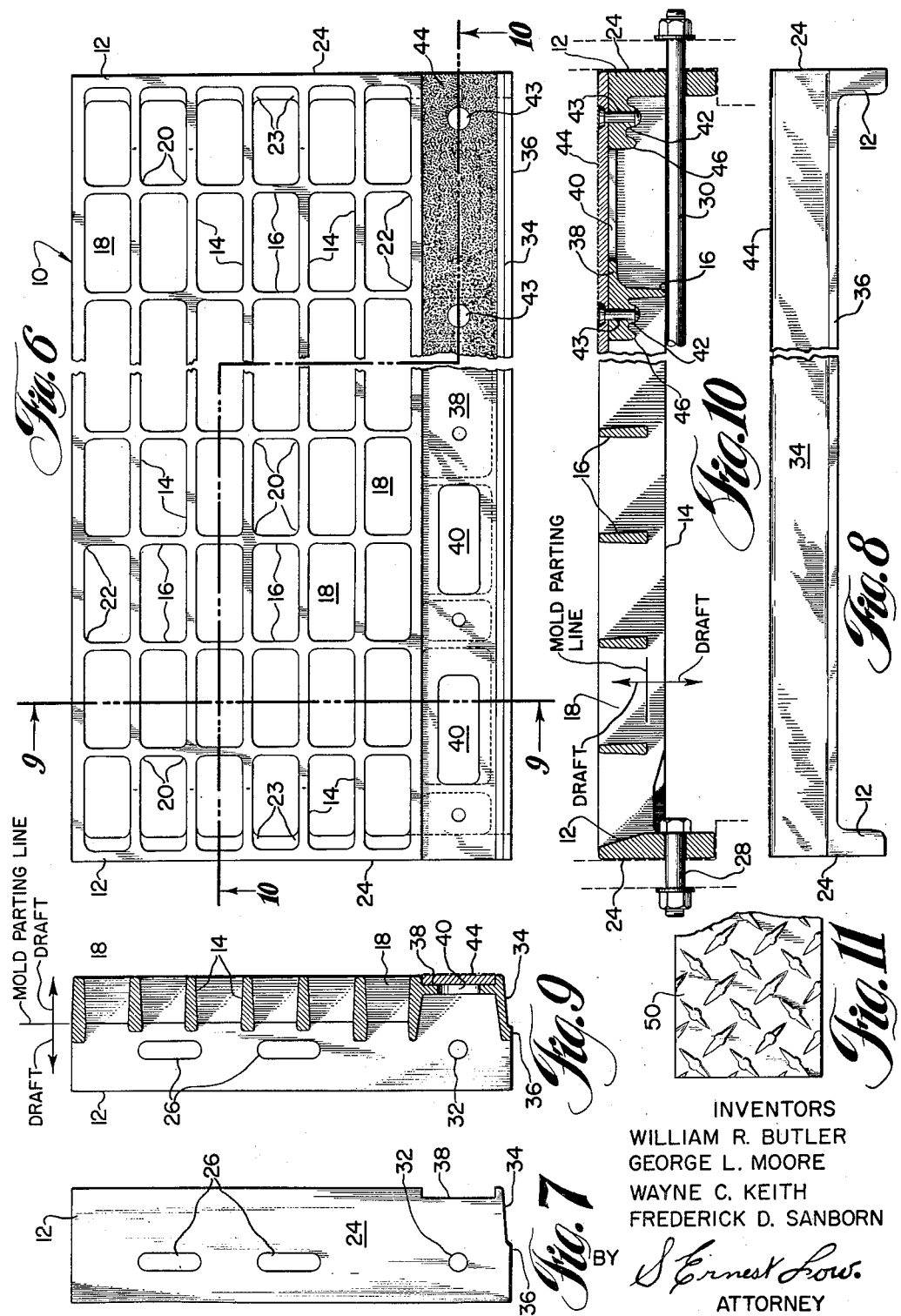

United States Patent Office 3,057,271
Patented Oct. 9, 1962

---

3,057,271
CAST STRUCTURAL GRATINGS
William R. Butler, Pittsburgh, Pa., George L. Moore, Hudson, and Wayne C. Keith, Fairview Park, Ohio, and Frederick D. Sanborn, Jr., Hinsdale, Ill., assignors to Aluminum Company of America, Pittsburgh, Pa., a corporation of Pennsylvania
Filed Dec. 13, 1957, Ser. No. 702,647
2 Claims. (Cl. 94—30)

This invention relates generally to cast grating type tread members, such as tread plates, platforms, decking and similar products suitable for use as load-carrying structural members in the construction and erection of installations normally subjected to severe traffic conditions, and is more particularly concerned with such products fabricated in the form of one-piece, light weight castings. It is more specifically addressed to light weight aluminum alloy die-cast safety type grating products requiring, in many instances, wear-resistant, anti-slipping material as a portion thereof, such as in stair treads provided with leading edge anti-slip nosings.

It has been common practice to build-up wrought gratings for use as tread plates from spaced rectangular metal bars supported on transverse rods passing through aligned apertures in the bars, the rods and bars so assembled being usually welded or mechanically connected together to form rigid structures.

It has also been common practice to provide tread plates in the form of perforated metal plates incorporating stiffening elements, such as angles, channels and the like, welded, riveted or bolted to the underside and/or marginal edges thereof.

The present invention differs from the known prior art practices in that it provides an open grill or grating tread member in the form of a single or one-piece cast metal product incorporating mounting features permitting its erection and installation in rigid load-carrying association and attachment to underlying and/or adjacent substructures.

An object of the present invention is to provide a one-piece cast tread member incorporating means for mounting the same in rigid assembly with adjacent supporting structure.

Another object of the invention is to provide a one-piece cast aluminum alloy grating type tread member incorporating lateral carrier plates or members in integral association with spaced load-bearing and spaced integrally attached cross bars.

Still another object of the invention is to provide a one-piece cast grating member presenting a beam section resistant to bending and capable of substitution for built-up wrought tread structures without any reduction in structural strength.

A further object of the invention is to provide a one-piece die-cast aluminum alloy stair tread presenting an open grill load-bearing surface area provided with an abrasive or safety type leading edge nosing.

Other objects and advantages of the products of the invention will become apparent on consideration of the following description and illustrations, in which:

FIG. 1 represents a top plan view of a grating member falling within the scope of the invention;

FIG. 2 represents an end elevational view of the tread member of FIG. 1;

FIG. 3 represents a front elevational view of the tread member of FIG. 1;

FIG. 4 represents a sectional elevational view taken on the plane 4—4 of FIG. 1;

FIG. 5 represents a sectional elevational view taken on the plane 5—5 of FIG. 1;

FIG. 6 represents a top plan view of a grating type stair tread incorporating an anti-skid nosing plate;

FIG. 7 represents an end elevational view of the stair tread of FIG. 6;

FIG. 8 represents a front elevational view of the stair tread of FIG. 6;

FIG. 9 represents a sectional elevational view of the stair tread of FIG. 6 taken on the plane 9—9 of FIG. 6;

FIG. 10 represents a sectional elevational view taken on the plane 10—10 of FIG. 6; and FIG. 11 represents an alternative stair tread nosing strip to that illustrated in FIGS. 6 through 9.

It will be observed that the grating members or products of both embodiments of the invention illustrated in the aforesaid drawings comprise a one-piece cast structure in the form of an open grid, load and traffic-bearing member composed of longitudinal spaced parallel load-bearing bars integrally attached at their ends to lateral side carrier rails or webs in combination with spaced cross bars integrally attached to the aforesaid longitudinal bearing bars at their points of intersection therewith. This basic construction, coupled with means for securing the products of the invention in assembled relationship with a suitable supporting structure for the same, provides a novel structure with or without the addition of an anti-skid, safety type leading edge nosing member, as in the case of a stair tread.

Referring in more detail to the illustrations attached hereto and forming a part of the invention, an open grid or grating member 10 is illustrated in FIGS. 1 through 5 suitable for use in platform construction and similar installations. The member 10 is preferably fabricated as an aluminum alloy casting, specifically, a die-casting, although other precision casting techniques and equipment may be employed in its fabrication.

The member 10 comprises lateral parallel spaced carrier plates, webs, or side rail members 12 to which are integrally connected or attached longitudinal spaced parallel bearing bars or webs 14 the extreme outer ones of which serve to constitute a closed rectangular frame including the carrier plates 12 as the short sides thereof. Cross bars 16 in parallel spaced relationship in respect to the lateral members 12 divide the load and traffic-bearing surface of the grating 10 into rectangular open cells 18.

On reference to FIGS. 4 and 5, it will be noted that the bearing bars or webs 14 extend somewhat lower or are greater in depth than the cross bar members 16 to thereby present greater cross-sectional area in resistance to bending or deflection, as a result of loads imposed on the grating member, particularly in the direction of the long dimension thereof. It will also be observed that jointure between bearing bars 14 and cross bars 16 incorporates curvilinear filleted surfaces 20, as well as similar jointure and curvilinear filleted surfaces 22 between the extreme ends of the cross bars 16 and outer marginal bearing bars 14, to provide thickened cross-sectional areas at the aforesaid joints. The extreme ends of the load-bearing bars 14 are also joined integrally with the spaced side rail members 12 by curvilinear filleted surfaces 23 to provide similar thickened jointure at these locations.

Application of preselected draft and mold parting techniques, in the precision casting of member 10 (FIGS. 1–5) thus far described, accounts for the provision of upwardly narrowing cross-sectional areas for the load-bearing bars 14 above a plane intermediate their depth, as well as downwardly narrowing cross-sectional areas below this plane. Similarly, the cross-sectional areas of cross bar members 16 are preferably reduced or tapered upwardly above the plane of their bases. In similar fashion, and as a direct result of the mold and draft employed in the fabrication of the products of the invention, the outwardly facing surfaces 24 of the side rail members 12 are preferably made substantially flat to lie in substantially parallel vertical planes. The inner surfaces of the side rail members 12 are preferably tapered or inclined, at least over a portion of their depth dimension, inwardly and downwardly to substantially the parting line indicated on FIGS. 4 and 5.

The substantially vertical, flat, outwardly disposed surfaces 24 of the side rail or web members 12 provide substantially flush attachment to similar substantially flat supporting surfaces, as indicated in broken line construction in FIG. 5. Adjacent members 10 may also be assembled with their exposed end rail surfaces 24 in abutting relationship to provide an assembled floor or platform arrangement. In either type of construction, underlying ledges may be provided in supporting contact with the bottom surfaces of the side rail members 12, as illustrated in FIG. 5 in the broken line construction shown therein.

Regardless of the particular construction employed in supporting and/or assembling the grating members 10, one or more apertures 26, preferably elongated to permit relative adjustments, are provided through the carrier plates 12 for receiving attaching devices, such as bolts, rivets, and the like 28. Clearance for inserting such attaching devices, as well as manipulating tools employed with the same, is preferably provided by locally relieving or decreasing the depth of the load-bearing bars 14, particularly adjacent the apertures 26 (FIGS. 4 and 5).

An additional support and attaching means may also be employed in the form of a rod or bar 30 extending through aligned openings 32 in the side rail or carrier plates 12. The member 30 preferably extends over the entire width of the member 10, or a plurality of the same in end-abutting relationship, and has its terminal ends projecting into bearing and/or fastening engagement with adjacent supporting structure (FIG. 5). Preferably at least one of the cross bar members 16 is extended locally below the base plane of its remaining counterparts immediately adjacent the side rail webs or carrier plates 12 to thereby bear against the rod member 30 (FIG. 5).

The embodiment of the invention illustrated in FIGS. 6 through 10 takes the form of an anti-skid, safety type grating stair tread. Therein the structure is substantially similar to that previously described (FIGS. 1 through 5), insofar as the lateral carrier plates 12, longitudinal bearing bars 14 and cross bars 16 are concerned, but incorporates in addition an integral nosing-supporting section along the leading edge of the tread member. Identical reference numerals have been employed to identify structure common to the products of FIGS. 1 through 5 and FIGS. 6 through 10, respectively.

The nosing section or portion of the stair tread member of FIGS. 6 through 10 is provided in the form of an integral depending front flange 34 having a reenforcing and finishing bead 36 along its lower terminal edge. Integral connection of the flange 34 to the body portion proper of the tread member is accomplished by a horizontal depressed web 38, continuation of, or substitution for, certain of the cross bars 16 beneath the web 38, as well as the side carrier plates 12. The web 38 is preferably lightened by apertures 40 and downwardly extending bosses 42 are integrally formed on the underside thereof, the bosses being drilled or cored to receive rivets or similar fastening elements 43 for securing an anti-skid plate member 44 in unitary attachment to the stair tread along its leading edge in substantially the plane of the top surface of the grating. Preferably and primarily for strength purposes, some of the cross bars 16 are continued as ribs beneath the depressed web 38 and additional ribs 46 are preferably provided adjacent the end edges defining the lightening apertures 40. The lightening apertures 40 also serve as drainage means below the nosing strip 44 and thus prevent formation and accumulation of moisture-induced corrosion products.

The stair treads of the invention are normally mounted on or secured to a suitable supporting structure, such as the side rails illustrated in broken line construction in FIG. 10, in the same manner as described for the grating type surfacing members of FIGS. 1 through 5. As in the case of the bar or rod 30 of FIG. 5, this same member (FIGS. 9 and 10) preferably bears against one or more of the ribs 16 or 46 extending locally downward into contact therewith.

Commercial stair tread products of the invention have been successfully fabricated as one-piece die-castings in aluminum alloys. Anti-skid nosing materials have been employed in such stair treads in the form of an aluminum alloy plate provided with tabular aluminum abrasive particles embedded in the same and preferably projecting slightly above the upper grating tread-surface thereof, as intended to be illustrated in FIGS. 6 through 10. An alternative all aluminum, non-sparking anti-skid plate 50 (FIG. 11) may be substitued for the abrasive type plate 44, if desired.

In the foregoing description, it is to be observed that the cast grating products of the invention incorporate webbed structures in which the section widths of the web members, and particularly members 14 and 16, are relatively small in comparison to their depth dimensions. It is also to be noted that the curvilinear filleted joints between the aforementioned webs provide thickened cross-sectional areas at the joints between the web members. This construction eliminates the cracks and crevices inherent in gratings assembled by welding and/or mechanical joining of individual bars and plate members, which inherently entrap foreign matter (welding fluxes) and dirt. Absence of the aforesaid joints and crevices in the products of the invention permit maintenance of sanitary standards at levels meeting the requirements of processing plants, such as dairies, breweries, pharmaceutical plants, and the like, as well as meeting the sanitation requirements of public buildings, factories and hospitals in general.

The curvilinear filleted joint construction and tapered cross-section of the webs employed in the grating products of the invention also enhance their usefulness where corrosive conditions would normally be expected to lead to high maintenance costs in that they provide substantial self-cleaning structures, when considered in terms of gratings incorporating angular joints and crevices, which latter gratings have a natural tendency to collect foreign matter and dirt deposits.

The mold parting line and directional draft legends applied on the illustrations of FIGS. 4, 5, 6 and 9 have been purposely determined and located in substantially the plane of the lower edges of the cross bars 16, draft or taper above the parting line in each instance accounting for the narrow widths of the side rails 12, load-bearing webs 14 and cross bars 16 in the plane of the top surface of the tread members to impart maximum anti-slipping properties to the tread members.

Of further import and significance in the grating members of the invention is the location of the parting lines in each instance as close as possible to the lower edge extreme tension fibers of the cross bar members 16 to thereby insure heaviest metal cross section in substantially the tension plane.

Castings generally are recognized as exhibiting greater strength in compression than in tension and the grating products of the invention, in the location of their parting lines in substantial coincidence with the tension fibers in the lower edge surfaces of the cross bar members 16, coupled with the extensions of the load-bearing bars 14 below the plane of the parting line in both embodiments of the invention, serves to establish the parting lines in substantially the neutral axis of the grating members with excess metal and increased cross-sectional web area in direct resistance to tensile stresses developed as a result of applied loading on the grating members. It is in view of this unique distribution and proportioning of the metal of the grating members that the products of the invention have been termed cast structural members.

In the preferred practice of the invention, the cast grating products are preferably fabricated from aluminum-magnesium alloys, where the magnesium is preferably present in amounts between 7 to 11 percent by weight. Such binary aluminum-magnesium casting alloys exhibit high strength and ductility and have desirable chemical properties in terms of resistance to corrosion and adaptability to being provided with protective chemical and anodic coatings, with or without subsequent paint coatings. The cast surfaces of such alloys can also be given, if desired, a high lustrous polish, and in many instances the stated alloys surpass ferrous structural materials, from a corrosion standpoint, under identical indoor and outdoor exposures. Regardless of the specific binary aluminum-magnesium alloy selected as the material from which the cast gratings of the invention are fabricated, it has been found that excellent structural results were obtained from alloys exhibiting an elongation of at least 5 percent in two inches and tensile strength of between 41,000 to 45,000 pounds per square inch, based on test bar determinations.

Commercially produced die-cast grating members of the invention in the form of rectangular grids of approximately 6" to 10" in width and 24" to 42" in length, respectively, and having a side carrier web (12) depth of approximately 2¼", web depths (14 and 16) of approximately 1½" and 1" respectively, and maximum web (14 and 16) thickness of approximately 5/32" have been fabricated in aluminum-magnesium alloy in which the magnesium was present in the amount of 8 percent by weight, balance substantially aluminum and normal impurities found in commercial aluminum and magnesium. These die-cast products, based on test bar determinations, exhibited an average elongation of 8 percent in two inches and average tensile strength of 45,000 pounds per square inch, with no evidence of brittleness in the finished cast grating members.

The one-piece cast products of the invention present upwardly tapered traffic-bearing edges, serving to provide maximum traction, while at the same time the crossover webs 14 and 16 and lateral carrier webs 12 are strengthened in their cross-sectional areas through increasing their thickness downwardly below their upper edges. The curvilinear thickened fillets incorporated in the integral joints between the webs and side rails of the grating products add to the overall structural strength of the grating products, while facilitating cleaning foreign matter from the grided cell structures.

Having thus described the invention, what is claimed is:

1. A structural safety stair tread comprising a one-piece open grid cast grating in the form of oppositely disposed spaced side carrier rail members, spaced load-bearing bars extending between and integrally joined at their ends to the rail members by thickened curvilinear filleted connections, transversely spaced cross bar members integrally joined to each of said load-bearing bars by thickened curvilinear filleted connections, said side carrier rail members, load-bearing bars and cross bar members all presenting upper edge surfaces in a common flat load and traffic-bearing plane, the aforesaid cast grating having a neutral axis disposed in a plane below and parallel to the flat load and traffic-bearing plane, said cross bar members having lower edges lying in the plane of the neutral axis and being of decreasing transverse cross-sectional width from maximum thickness in the plane of the neutral axis to narrowest width of the same in the load and traffic-bearing plane, said load-bearing bars extending downwardly below the cross bar members and being of decreasing transverse cross-sectional width in both directions from maximum transverse thickness in the plane of the neutral axis of the cast grating, lower edges of the load-bearing bars terminating in a common plane below and parallel to the load and traffic-bearing plane, said side carrier rail members providing substantially flat parallel and vertical outwardly disposed surfaces over the entire depth thereof and their inner oppositely disposed width-defining surfaces sloping downwardly from the load and traffic-bearing plane to a maximum transverse cross-sectional width thickness in the plane of the neutral axis of the cast grating, the side carrier rail members otherwise extending downwardly below the lower edges of the load-bearing bars, a leading edge nosing-supporting structure in integral cast connection to the cast grating, said structure comprising a flange located forwardly of and parallel to an outermost load-bearing bar of the cast grating in integral cast end connection to the side carrier rail members, said flange extending in depth from substantially the load and traffic-bearing plane to the plane of the lower edges of the load-bearing bars, a web extending between the flange and its adjacent outermost load-bearing bar in integral cast connection to the cast grating, said web presenting an upper flat surface parallel to the load and traffic-bearing plane of said cast grating and depressed slightly below the same, an anti-skid safety tread plate overlying and fixedly supported on the web with its upper exposed surface in substantially the plane of the load and traffic-bearing surface of the cast grating, at least one aperture provided transversely through each of the side carrier rail members, and said apertures being adapted to receive securing means extending therethrough from spaced stair tread-supporting rail members presenting opposed vertical flat parallel surfaces in abutment with the outwardly disposed surfaces of the side carrier rail members.

2. An aluminum-magnesium alloy structural safety stair tread comprising in combination a one-piece open grid grating and integral leading edge nosing-supporting structure in the form of a die casting made from said alloy containing 7 to 11 percent magnesium, balance substantially aluminum and normal impurities present in commercial aluminum and magnesium, said one-piece open grid grating comprising spaced load-bearing bars integrally joined at their ends to oppositely disposed spaced side carrier rail members by thickened curvilinear filleted connections, transversely spaced cross bar members integrally joined to each of said load-bearing bars by thickened curvilinear filleted connections, said side carrier rail members, load-bearing bars and cross bar members all presenting upper edge surfaces in a common flat load and traffic-bearing plane, the aforesaid grating having a neutral axis disposed in a plane below and parallel to the flat load and traffic-bearing plane, said cross bar members having lower edges lying in the plane of the neutral axis of the grating and being of decreasing transverse cross-sectional width from maximum thickness in the plane of the neutral axis to narrowest width of the same in the load and traffic-bearing plane, said load-bearing bars extending downwardly below the cross bar members and being of decreasing transverse cross-sectional width in both directions from maximum transverse thickness in the plane of the neutral axis of the grating, lower edges of the load-bearing bars terminating in a common plane below and parallel to the load and traffic-bearing plane, said side carrier rail members providing substantially flat parallel and vertical outwardly disposed surfaces over the entire depth thereof and their inner oppositely disposed width-defining surfaces sloping downwardly from the load and traffic-bearing plane to a maximum transverse cross-sectional width thickness in the plane of the neutral axis of the grating, the side carrier rail members otherwise extending downwardly below the lower edges of the load-bearing bars, the integral leading edge nosing-supporting structure comprising a flange located forwardly and substantially parallel to an outermost load-bearing bar of the die cast open grid grating in cast connection to the side carrier rail members, said flange extending in depth from substantially the load and traffic-bearing plane to the plane of the lower edges of the load-bearing bars, a web extending between and cast integral with the flange and its adjacent outermost load-bearing bar, said web presenting an upper flat surface parallel to the load and traffic-bearing plane and depressed slightly below the same, an anti-skid safety tread plate overlying and fixedly supported on the web with its upper exposed surface in substantially the plane of the aforesaid load and traffic-bearing surface of the open grid grating, at least one aperture provided transversely through each of the side carrier rail members, and said apertures being adapted to receive securing means extending therethrough from spaced stair tread-supporting rail members presenting opposed vertical flat parallel surfaces in abutment with the outwardly disposed surfaces of the side carrier rail members.

References Cited in the file of this patent

UNITED STATES PATENTS

| | | |
|---|---|---|
| 893,198 | Schachner | July 14, 1908 |
| 1,101,359 | Thompson | June 23, 1914 |
| 1,198,306 | Young | Sept. 12, 1916 |
| 1,354,998 | Paulson | Oct. 5, 1920 |
| 1,645,538 | Macdonald | Oct. 18, 1927 |
| 1,660,769 | Smith | Feb. 28, 1928 |
| 1,799,658 | Utzler | Apr. 7, 1931 |
| 1,868,107 | Lackman | July 19, 1932 |
| 2,135,837 | Pattison | Nov. 8, 1938 |
| 2,169,649 | Knapp | Aug. 15, 1939 |
| 2,182,690 | Cole | Dec. 5, 1939 |
| 2,190,214 | Nagin | Feb. 13, 1940 |
| 2,269,522 | Dreibuss | Jan. 13, 1942 |
| 2,437,186 | Collins | Mar. 2, 1948 |
| 2,469,070 | Greulich | May 3, 1949 |
| 2,577,890 | Hardy | Dec. 11, 1951 |
| 2,742,121 | Liskey | Apr. 17, 1956 |

FOREIGN PATENTS

| | | |
|---|---|---|
| 382,570 | Great Britain | 1932 |